J. T. FRY.
Rotary-Churn.
No. 208,587.                    Patented Oct. 1, 1878.
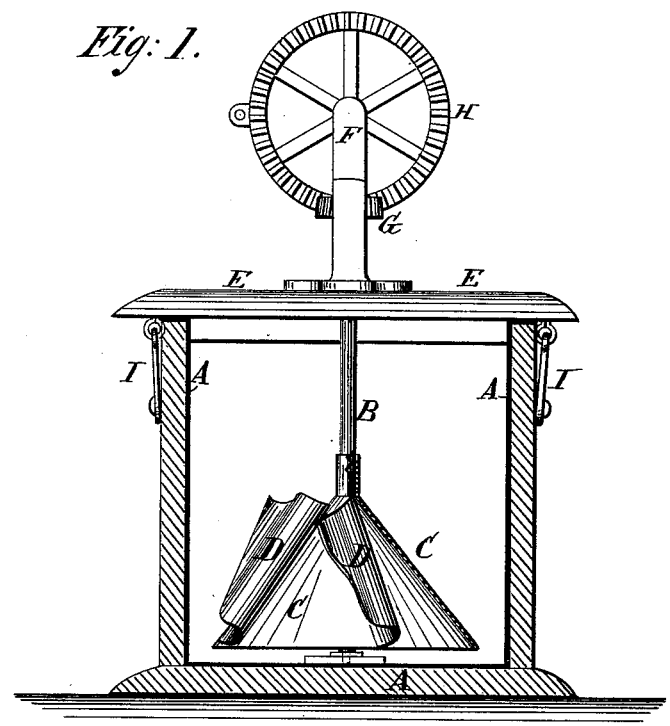
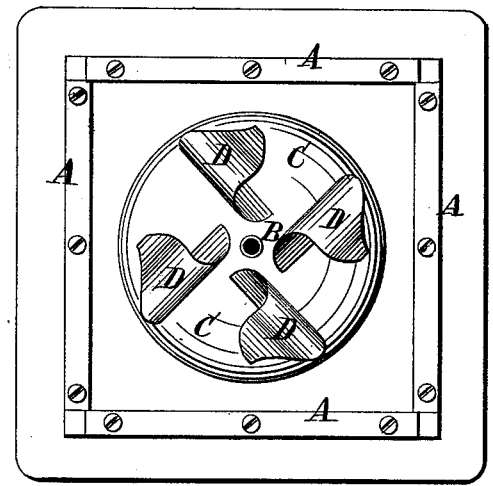
WITNESSES:
Achilles Sehehl.
C. Sedgwick
INVENTOR:
J. T. Fry
BY
ATTORNEYS.

UNITED STATES PATENT OFFICE.

JOHN T. FRY, OF BROOKLYN, IOWA.

IMPROVEMENT IN ROTARY CHURNS.

Specification forming part of Letters Patent No. 208,587, dated October 1, 1878; application filed August 31, 1878.

*To all whom it may concern:*

Be it known that I, JOHN T. FRY, of Brooklyn, in the county of Poweshiek and State of Iowa, have invented a new and Improved Churning Apparatus, of which the following is a specification:

Figure 1 is a side view of my improved churning apparatus, the churn-body being shown in section. Fig. 2 is a top view of the same, the cover and driving mechanism being removed, and the dasher-shaft being shown in cross-section.

Similar letters of reference indicate corresponding parts.

The object of this invention is to furnish an improved churning apparatus which shall be simple in construction, convenient in use, easily operated, and effective in operation, bringing the butter very quickly.

The invention consists in the hollow cone provided with the wings or buckets, in combination with the dasher-shaft, the driving mechanism, and a churn-body, as hereinafter fully described.

A represents the churn-body, which may be made square or round, and of any desired size. To the center of the bottom of the churn-body A is attached a socket, in which revolves the lower end of the dasher-shaft B. The dasher-shaft B passes through, and to it is attached, the apex of the hollow cone or funnel C.

To the outer surface of the hollow cone C are attached four (more or less) wings or buckets, D, which are made semi-tubular in form, are attached at one edge to the said cone C, and have their other or free edges extended, tapered, and curved back, as shown in Figs. 1 and 2.

The cover E is made in two parts or halves, either of which may be removed without disturbing the other. In the centers of the inner edges of the parts of the cover E are formed half-round notches for the passage of the dasher-shaft B, the upper end of which revolves in a socket in the bracket F. The base of the bracket F is secured to one of the parts of the cover E, so that the other part of the said cover may be removed to inspect the progress of the churning without disturbing the driving mechanism.

To the upper part of the dasher-shaft B is attached a small bevel-gear wheel, G, into the teeth of which mesh the teeth of the larger bevel-gear wheel H. The gear-wheel H is pivoted to the bracket F, and to it is attached the crank, by means of which the apparatus is operated.

The part of the cover E to which the driving mechanism is attached is secured to the churn-body A by hooks I, or other convenient fastenings, so that the said mechanism may be held firmly in place when in use.

Having thus fully described my invention, I claim as new and desire to secure by Letters Patent—

The hollow cone C, provided with the wings or buckets D, in combination with the dasher-shaft B, the driving mechanism G H, and a churn-body, A, substantially as herein shown and described.

JOHN T. FRY.

Witnesses:
J. E. SNYDER,
J. S. SNYDER.